United States Patent
Van Doren et al.

(10) Patent No.: US 12,524,844 B2
(45) Date of Patent: Jan. 13, 2026

(54) REAL-TIME CARDIAC MAGNETIC RESONANCE (MR) BY RESPIRATORY PHASE

(71) Applicants: Steven R. Van Doren, Columbia, MO (US); Robert P. Thomen, Columbia, MO (US); Talissa A. Altes, Columbia, MO (US); Jia Xu, Columbia, MO (US); Zhijian Luan, Columbia, MO (US); Ummul Afia Shammi, Columbia, MO (US)

(72) Inventors: Steven R. Van Doren, Columbia, MO (US); Robert P. Thomen, Columbia, MO (US); Talissa A. Altes, Columbia, MO (US); Jia Xu, Columbia, MO (US); Zhijian Luan, Columbia, MO (US); Ummul Afia Shammi, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 485 days.

(21) Appl. No.: 18/311,089

(22) Filed: May 2, 2023

(65) Prior Publication Data
US 2023/0351554 A1 Nov. 2, 2023

Related U.S. Application Data

(60) Provisional application No. 63/337,464, filed on May 2, 2022.

(51) Int. Cl.
*G06T 5/70* (2024.01)
*A61B 5/055* (2006.01)
*G06T 7/00* (2017.01)

(52) U.S. Cl.
CPC ............ *G06T 5/70* (2024.01); *A61B 5/055* (2013.01); *G06T 7/0012* (2013.01); *G06T 2207/10088* (2013.01); *G06T 2207/10132* (2013.01); *G06T 2207/30048* (2013.01)

(58) Field of Classification Search
None
See application file for complete search history.

(56) References Cited

U.S. PATENT DOCUMENTS

2022/0117494 A1* 4/2022 Huang ................ A61B 5/0095

OTHER PUBLICATIONS

G. Constantine et al., "Role of MRI in clinical cardiology", Lancet. 363 (2004) pp. 2162-2171 (10 pages).

(Continued)

*Primary Examiner* — Lennin R Rodriguezgonzalez
(74) *Attorney, Agent, or Firm* — Shook, Hardy & Bacon LLP

(57) ABSTRACT

Systems, methods, and media are provided for image correction of magnetic resonance images (MRIs). Operations include capturing image data using a medical imaging system, and identifying respiratory principal components and cardiac principal components from the image data. The operations also include classifying the cardiac principal components based on whether the cardiac principal components are associated with expiration events or inspiration events of the respiratory principal components, and generating corrected cardiac images using the classified cardiac principal components.

20 Claims, 10 Drawing Sheets

(56) References Cited

OTHER PUBLICATIONS

C. M. Kramer et al., "Standardized cardiovascular magnetic resonance imaging (CMR) protocols: 2020 update", J. Cardiovasc. Magn. Reson. (2020) 22:17 (18 pages).
J. Barkhausen et al., "Assessment of Ventricular Function with Single Breath-Hold Real-Time Steady-State Free Precession Cine MR Imaging", American Journal of Roentgenology, vol. 178 (2002) pp. 731-735 (5 pages).
M. Gulati et al., "2021 AHA/ACC/ASE/CHEST/SAEM/SCCT/SCMR Guideline for the Evaluation and Diagnosis of Chest Pain: A Report of the American College of Cardiology/American Heart Association Joint Committee on Clinical Practice Guidelines", Journal of the American College of Cardiology, vol. 78, Issue 22 (2021) pp. e187-e285 (99 pages).
S. Zhang et al., "Real-time magnetic resonance imaging of cardiac function and flow—recent progress", Quant. Imaging Med. Surg. 4 (2014) pp. 313-329 (17 pages).
P. C. Yang et al., "New real-time interactive cardiac magnetic resonance imaging system complements echocardiography", J. Am. Coll. Cardiol. 32 (1998) pp. 2049-2056 (8 pages).
L. A. Barnett et al., "Chest pain and shortness of breath in cardiovascular disease: a prospective cohort study in UK primary care", BMJ Open. 7 (2017) (10 pages).
M. Usman et al., "Motion corrected compressed sensing for free-breathing dynamic cardiac MRI", Magn. Reson. Med. 70 (2013) pp. 504-516 (13 pages).
G. Strauss-Blasche et al., "Relative Timing Of Inspiration And Expiration Affects Respiratory Sinus Arrhythmia", Clin. Exp. Pharmacol. Physiol. 27 (2000) pp. 601-606 (6 pages).
M. W. Agelink et al., "Standardized tests of heart rate variability: normal ranges obtained from 309 healthy humans, and effects of age, gender, and heart rate", Clin. Auton. Res. 11 (2001) pp. 99-108 (10 pages).
K. S. Nayak et al., "Real-Time Magnetic Resonance Imaging", J. Magn. Reson. Imaging. 55 (2022) pp. 81-99 (37 pages).
D. Voit et al., "Real-time cardiovascular magnetic resonance at 1.5 T using balanced SSFP and 40 ms resolution", J. Cardiovasc. Magn. Reson. 15 (2013) 79 (8 pages).
H. Haji-Valizadeh et al., "Validation of highly accelerated real-time cardiac cine MRI with radial k-space sampling and compressed sensing in patients at 1.5T and 3T", Magn. Reson. Med. 79 (2018) pp. 2745-2751 (7 pages).
A. Hauptmann et al., "Real-time cardiovascular MR with spatio-temporal artifact suppression using deep learning—proof of concept in congenital heart disease", Magn. Reson. Med. 81 (2019) pp. 1143-1156 (14 pages).
E. Piekarski et al., "Use of self-gated radial cardiovascular magnetic resonance to detect and classify arrhythmias (atrial fibrillation and premature ventricular contraction)", J Cardiovasc Magn Reson. 18:83 (2016) (10 pages).
C. Unterberg-Buchwald et al., Real time cardiac MRI and its clinical usefulness in arrhythmias and wall motion abnormalities, J. Cardiovasc. Magn. Reson. 16 (2014) P34 (2 pages).
B. D. Allen et al., Accelerated real-time cardiac MRI using iterative sparse SENSE reconstruction: comparing performance in patients with sinus rhythm and atrial fibrillation, Eur. Radiol. 28 (2018) pp. 3088-3096 (9 pages).
R. Ahmad et al., Reducing sedation for pediatric body MRI using accelerated and abbreviated imaging protocols, Pediatr. Radiol. 48 (2018) pp. 37-49 (13 pages).
J. A. Steeden et al., "Real-time assessment of right and left ventricular volumes and function in children using high spatiotemporal resolution spiral bSSFP with compressed sensing", J. Cardiovasc. Magn. Reson. 20 (2018) 79 (11 pages).
P. Lurz et al., "Impact of reduction in right ventricular pressure and/or volume overload by percutaneous pulmonary valve implantation on biventricular response to exercise: an exercise stress real-time CMR study", Eur. Heart J. 33 (2012) pp. 2434-2441 (8 pages).
P. M. Jakob et al., "Accelerated Cardiac Imaging Using the SMASH Technique", J. Cardiovasc. Magn. Reson. 1 (1999) pp. 153-157 (6 pages).
H.P. Kühl et al., "Assessment of Myocardial Function with Interactive Non-Breath-hold Real-time MR Imaging: Comparison with Echocardiography and Breath-hold Cine MR Imaging", Radiology. 231 (2004) pp. 198-207 (10 pages).
A. Bustin et al., From Compressed-Sensing to Artificial Intelligence-Based Cardiac MRI Reconstruction, Front. Cardiovasc. Med. 7 (2020) (19 pages).
C. A. Baron et al., "Rapid compressed sensing reconstruction of 3D non-Cartesian MRI", Magn. Reson. Med. 79 (2018) 2685-2692 (17 pages).
M. Bilal et al., Respiratory Motion Correction for Compressively Sampled Free Breathing Cardiac MRI Using Smooth I (1)-Norm Approximation, Int. J. Biomed. Imaging. 2018 (2018) 7803067 (13 pages).
L. Feng et al., "Golden-Angle Radial Sparse Parallel MRI: Combination of Compressed Sensing, Parallel Imaging, and Golden-Angle Radial Sampling for Fast and Flexible Dynamic Volumetric MRI", Magn Reson Med. 72 (2014) pp. 707-717 (22 pages).
M. Lustig et al., "Sparse MRI: The application of compressed sensing for rapid MR imaging", Magn. Reson. Med. 58 (2007) pp. 1182-1195 (14 pages).
R. Zhou et al., "Free-breathing cine imaging with motion-corrected reconstruction at 3T using Spiral Acquisition with Respiratory correction and Cardiac Self-gating (SPARCS)", Magn. Reson. Med. 82 (2019) 706-720 (27 pages).
J. Wang et al., "Free-breathing High-resolution Spiral Real-time Cardiac Cine Imaging at 1.5 T with DEep learning-based Spiral Image Reconstruction (DESIRE)", in: ISMRM 30th Annu. Sci. Sess., ISMRM, London, UK, 2022 (3 pages).
B. M. Ahlander et al., "An echo-planar imaging sequence is superior to a steady-state free precession sequence for visual as well as quantitative assessment of cardiac magnetic resonance stress perfusion", Clin. Physiol. Funct. Imaging. 37 (2017) 52-61 (10 pages).
O. Bieri et al., "Fundamentals of balanced steady state free precession MRI", J. Magn. Reson. Imaging. 38 (2013) 2-11 (10 pages).
M. Schar et al., "Cardiac SSFP imaging at 3 Tesla", Magn. Reson. Med. 51 (2004) 799-806 (8 pages).
P. Kellman et al., "Fully automatic, retrospective enhancement of real-time acquired cardiac cine MR images using image-based navigators and respiratory motion-corrected averaging", Magn Reson Med. 59 (2008) 771-778 (8 pages).
A. C. Larson et al., "Self-gated cardiac cine MRI", Magn. Reson. Med. 51 (2004) 93-102 (10 pages).
J. Xu et al., "Tracking Equilibrium and Nonequilibrium Shifts in Data with TREND", Biophys. J. 112 (2017) 224-233 (10 pages).
F. Novillo et al., "Unsupervised respiratory signal extraction from ungated cardiac magnetic resonance imaging at rest and during exercise", Phys. Med. Biol. 64 (2019) 065001 (20 pages).
M. K. Nath et al., "Independent component analysis of functional MRI data", in: TENCON 2008—2008 IEEE Reg. 10 Conf., 2008: pp. 1-6 (6 pages).
I. T. Jolliffe et al., "Principal component analysis: a review and recent developments", Philos. Trans. R. Soc. A Math. Phys. Eng. Sci. 374 (2016) (16 pages).
I. C. McManus et al., "Arnheim's Gestalt Theory of Visual Balance: Examining the Compositional Structure of Art Photographs and Abstract Images", !perception. 2 (2011) 615-647 (33 pages).
V. D. Calhoun et al., "Multisubject Independent Component Analysis of fMRI: A Decade of Intrinsic Networks, Default Mode, and Neurodiagnostic Discovery", IEEE Rev. Biomed. Eng. 5 (2012) 60-73 (34 pages).
W. Du et al., "A novel approach for assessing reliability of ICA for FMRI analysis", in: 2014 IEEE Int. Conf. Acoust. Speech Signal Process, 2014: pp. 2084-2088 (5 pages).

\* cited by examiner

REAL-TIME CARDIAC MAGNETIC RESONANCE (MR) BY RESPIRATORY PHASE

CROSS-REFERENCE TO RELATED APPLICATIONS

This application claims the benefit of priority to U.S. Provisional Application No. 63/337,464, entitled "Real-Time Cardiac Magnetic Resonance (MR) by Respiratory Phase," filed May 2, 2022, which is expressly incorporated by reference in its entirety.

STATEMENT REGARDING FEDERALLY SPONSORED RESEARCH OR DEVELOPMENT

This work was supported by the Coulter Translational Partnership Program at the University of Missouri.

BACKGROUND

MRI stands for "Magnetic Resonance Imaging." It is a medical imaging technique that uses a strong magnet and radio waves to create detailed images of the internal structures of the body. MRI is commonly used to visualize organs, soft tissues, and bones, including the brain, spine, joints, and heart.

SUMMARY

Cardiac image data is capturing using a medical imaging system, such as an MRI or ultrasound, during respiration of the subject. Principal component analysis is applied to the cardiac image data to resolve motion within the image data videos into principal components, including respiratory principal components and cardiac principal components, each varying in time.

Once identified, the cardiac principal components, such as complete cardiac cycles identified within the cardiac principal components, are classified as occurring at times corresponding to inspiration events or expiration events.

Corrected cardiac images can be generated based on the classification of the cardiac principal components. That is, one or more of complete cardiac cycles corresponding to either inspiration events or expiration events may be selected for generating the corrected cardiac images. In an aspect, the complete cardiac cycles corresponding to inspiration events are written to a dynamic image file separately from a dynamic image file comprising the complete cardiac cycles corresponding to the expiration events, and the corrected (simplified) dynamic cardiac images are generated based on the selected file.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
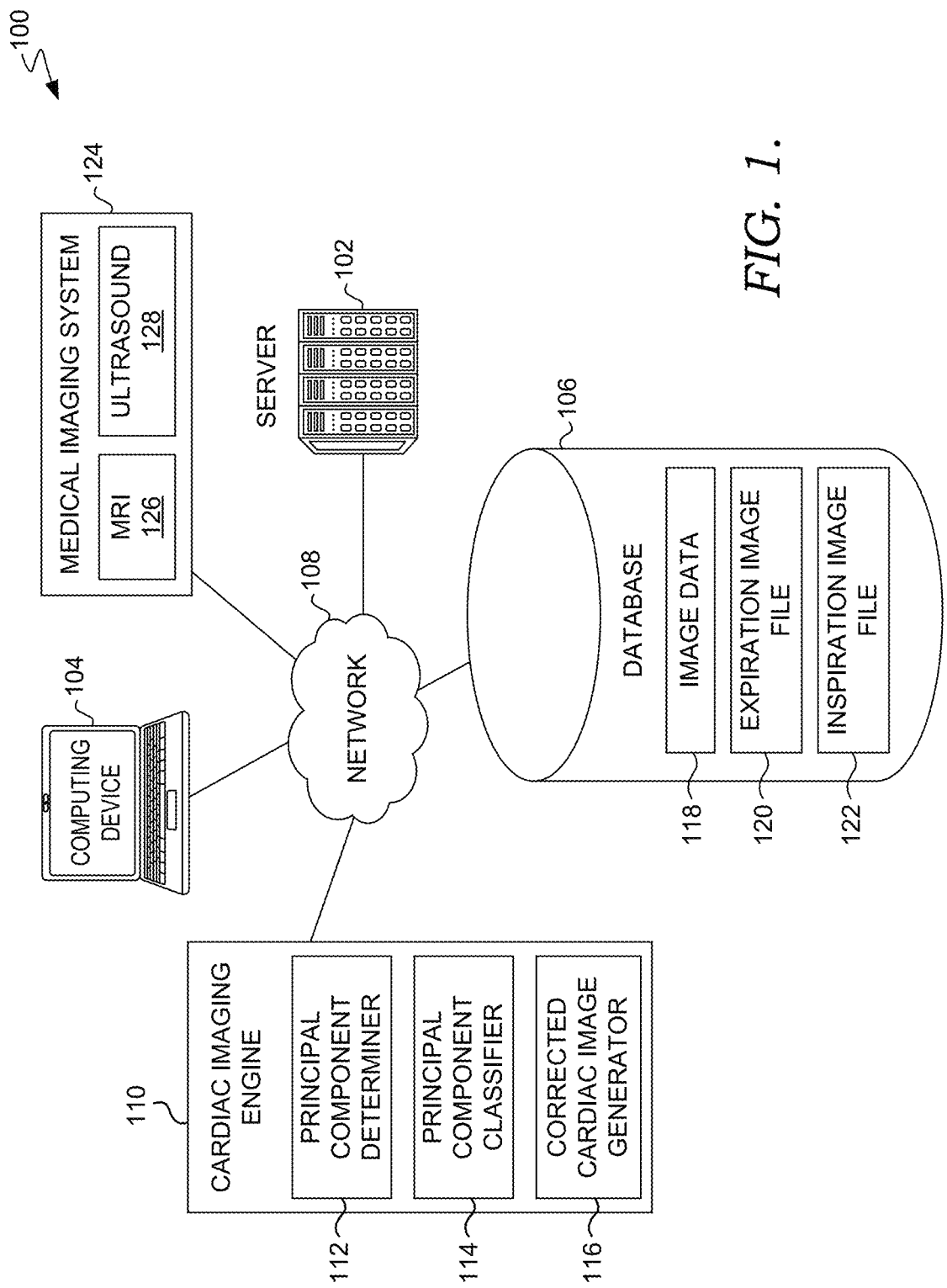
FIG. 1 illustrates an example operating environment in which aspects of the technology may be employed, in accordance with an aspect described herein.

Standard cardiac MRI provides thorough cardiac functional insights, but requires breath holds not feasible for some patients, and averaging unsuited to arrhythmias. Real-time acquisitions sidestep these problems but introduce the complexity of respiratory displacement of the heart that is substantial in short axis views.

To support cardiac magnetic resonance (CMR) acquisitions during breathing without need of electrocardiogram (ECG), a system for heartbeats from expiration and inspiration to decrease apparent respiratory motion has been developed. The system mitigates the effects of respiratory displacement of the heart, and resolves respiratory motions and cardiac cycles.

CMR has been the gold standard for cardiac function evaluation. It is a non-ionizing imaging modality that produces high spatial resolution images with excellent soft tissue contrast. Multi-slice 2D (two-dimensional) cine images can provide the anatomy of the entire heart and reveal the myocardial functionality of a patient in a single imaging session. The American Heart Association (AHA) and American College of Cardiology (ACC) guidelines strongly recommend CMR for patients with chest pain and either myopericarditis or aortic dissection. In many settings calling for stress testing, the guidelines strongly recommended use of stress CMR.

Despite the appeal of cine CMR, these conventional techniques use repeated breath holds and synchronization using ECG to guide averaging and merging of frames into a composite cardiac cycle. These requirements can result in blurring, prolonged exams, and discomfort for patients with arrhythmias or who are unable to comply with the breath holds, e.g., due to chronic respiratory disease or unconsciousness in the ICU (intensive care unit). The breath holds necessary in these conventional methods are sometime challenging for other groups of patients as well, such as those that have been sedated or are otherwise unconscious, along with young children and the elderly. Heart failure, respiratory movement during breath holds, coughing, and patient movement due to discomfort inside the scanner commonly arise and cause distortions in the imagery and stitched imagery. In addition, standard cine CMR does not capture the effects of the respiratory cycle upon cardiac cycles, i.e., heart rate increases with inspiration and decreases during expiration.

Various real-time acquisition methods can cross the barriers to application of cine MRI to patients who cannot comply with breath hold instructions or who are affected by an arrhythmia that interferes in cardiac gating. For example, some imaging of cardiac arrhythmias and abnormal wall motion was demonstrated with real-time CMR without breath holds. It is also desirable to expedite imaging of children with congenital heart disease and decrease the need for sedating them. The effects of percutaneous pulmonary valve implantation during exercise were studied with stress CMR in real-time. However, even in these methods, the presence of breathing motion in real-time scans presents a challenge for the interpreting physician due to distortions in the images that may arise from the breathing motion.

Several methods for fast acquisition of data have been developed. These fast image acquisition techniques can reduce the need for hardware-dependent cardiac gating or respiratory navigation, allowing quick scanning of multiple tomographic views and instant image-based feedback. Some of these acquisition techniques include parallel imaging and sparse sampling by compressed sensing, radial, and spiral acquisitions. Previously popularized pulse sequences include echo planer imaging (EPI) and inversion-recovery single-shot balanced steady-state free precession (BSSFP). These techniques improve spatial and temporal resolution. However, real-time MRI acquisition of many frames throughout the range of respiratory motion introduces more variability among frames, posing challenges for motion correction. Image-based navigation and image registration and transformation schemes were introduced to correct respiratory motion. However, image registration can distort images by forcing agreement with reference frames.

The technology herein addresses, in part, the complexity added by real-time, free-breathing MRI acquired without cardiac gating. The technology accommodates the breathing of the subject and decrease the distraction of the ongoing breathing motion, thus allowing suitable CMR images to be acquired without breath holds by the patient, departing from many of the conventional methods. In part, this is a result of the classification of cardiac cycles as events during inspiration or expiration, e.g., occurring at particular times within respiration.

The technology decreases apparent respiratory motions in dynamic CMR by classifying heartbeats according to respiratory phase. Further, the breathing motion is monitored retrospectively using post-processing, which also then segregates the cardiac cycles collected during end-expiration and end-inspiration. This is an advantage over many prior methods, since hardware for monitoring breathing does not necessarily have to be used during MRI scans, and further, this alleviates the need to synchronize respiration monitoring with the MRI scan.

To do so, the technology applies principal component analysis (PCA) to dissect the temporal fluctuations of dynamic series of CMR images (not in k-space). PCA is able to separate, both temporally and spatially, the large respiratory motions from cycles between systole and diastole, smaller cardiac motions, and turbulent blood flow. Compared to segmentation, PCA and independent component analysis (ICA) hold inherent advantages in separation of concurrent respiratory and cardiac processes in the time dimension, globally throughout the dynamic 3D (three-dimensional) scan. Compared to ICA, PCA is simpler to implement.

These advantages of PCA were exploited to characterize the phases of respiratory and cardiac cycles. Real-time CMR scans can be acquired during breathing without any gating, image-based navigators, or breath-holding maneuvers. From DICOM (Digital Imaging and Communications in Medicine) images with hundreds of frames, the technology groups heartbeats by respiratory phase, which quantifiable decreases apparent respiratory displacements of the heart in the set of beats. Not only does the appearance of respiratory motion decrease within the subsets of beats, but these subsets also retain diagnostic quality according to scores by expert readers blinded to the post-processing. The technology made correct decisions when challenged by the arrhythmia and irregular breathing of a subject. The results identify utility in deriving cardiac cycles from end-expiration and perhaps end-inspiration from real-time CMR exams of patients unsuited to standard cine CMR.

One example method that achieves these benefits captures image data using a medical imaging system, such as an MRI or ultrasound. The image data can be captured over a period of time, such as that in the range from about 15 seconds to about 60 seconds. An imaging time less than about one minute has been identified as suitable. Within the image data, respiratory principal components and cardiac principal components are identified. To do so, the respiratory principal components and the cardiac principal components can be identified in the frequency domain by applying Fourier transform to the image data. Respiratory principal components include expiration events and inspiration events, i.e., near the full extents of breaths out and in, known as end-expiration and end-inspiration in medicine. Inspiration events refer to the full extent of breaths in. Expiration events refer to the full extent of breaths out.

Having identified the respiratory principal components and the cardiac principal components, complete cardiac cycles within the cardiac principal components can be identified. For instance, these can be identified based on systole, e.g., from end-systole to end-systole. Some of the complete cardiac cycles are classified as corresponding to expiration events or inspiration events.

Once classified, complete cardiac cycles can be used to generate corrected cardiac images based on the classification. For example, one or more of the complete cardiac cycles corresponding to expiration events can be used or one or more of the complete cardiac cycles corresponding to inspiration events to generate the corrected cardiac images. The corrected cardiac images may comprise one or more complete cardiac cycles. In an aspect, the one or more of the complete cardiac cycles corresponding to expiration events is written to an expiration image file, e.g., an expiration DICOM file, while one or more of the complete cardiac cycles corresponding to inspiration events are written to an inspiration image file, e.g., an inspiration DICOM file, from which the corrected cardiac images can be retrieved and generated for presentation at a user interface of a computing device.

It will be realized that the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and database 106, which are communicating via network 108. Operating environment 100 further comprises cardiac imaging engine 110 and medical imaging system 124, which are also illustrated as communicating via network 108.

Database 106 generally stores information, including data, computer instructions (e.g., software program instructions, routines, or services), or models used in embodiments of the described technologies. Although depicted as a single database component, database 106 may be embodied as one or more databases or may be in the cloud. In aspects, database 106 is representative of a distributed ledger network.

Network 108 may include one or more networks (e.g., public network or virtual private network (VPN)) as shown with network 108. Network 108 may include, without limitation, one or more local area networks (LANs) wide area networks (WANs), or any other communication network or method.

Generally, server 102 is a computing device that implements functional aspects of operating environment 100, such as one or more functions of cardiac imaging engine 110 to facilitate generating cardiac images, including corrected cardiac images, as will be described. One suitable example of a computing device that can be employed as server 102 is described as computing device 900 with respect to FIG. 9. In implementations, server 102 represents a back-end or server-side device.

Computing device 104 is generally a computing device that may be used to facilitate generation of cardiac images in coordination with server 102. For instance, computing device 104 may operationally control medical imaging system 124 to collect image data, such as image data 118. Computing device 104 may comprise presentation components, e.g., output components that generate and provide cardiac images, such as corrected cardiac images. For instance, computing device 104 may access a data file from database 106, such as expiration image file 120 or inspiration image file 122, and from it, generate cardiac images for presentation at computing device 104.

As with other components of FIG. 1, computing device 104 is intended to represent one or more computing devices. One suitable example of a computing device that can be employed as computing device 104 is described as computing device 900 with respect to FIG. 9. In implementations, computing device 104 is a client-side or front-end device. In addition to server 102, computing device 104 may implement functional aspects of operating environment 100, such as one or more functions of cardiac imaging engine 110. It will be understood that some implementations of the technology will comprise either a client-side or front-end computing device, a back-end or server-side computing device, or both executing any combination of functions from cardiac imaging engine 110, among other functions.

Medical imaging system 124 comprises MRI 126 or ultrasound 128, or other diagnostically similar device. An aspect of the technology generates corrected cardiac images from image data collected using MRI 126. Another aspect of the technology generates corrected cardiac images from image data collected by ultrasound 128. Thus, image data 118 may include image data collected by medical imaging system 124. For instance, image data 118 can comprises image data collected from either MRI 126 or ultrasound 128, or both.

In general, MRI 126 may be an MRI system capable of collecting a series of 2D or 3D MRI images. One example of a suitable MRI system that may be used is a 3T Siemens Magnetom Vida (Siemens Healthcare, Erlangen, Germany). One example uses an 18-channel chest radiofrequency coil and compressed sensing.

In general, ultrasound 128 may be a 2D, 3D, or 4D ultrasound machine, or other like ultrasound device. In an aspect, ultrasound 128 is a type of ultrasound suitable for performing an echocardiogram. One example that may be suitable is a Vivid E Series ultrasound by GE Healthcare.

Throughout this disclosure, the technology is primarily described with reference to using an MRI system, such as MRI 126. Such description is provided for brevity and clarity when describing aspects of the technology. However, it is noted that many of the aspects described may also be performed using an ultrasound machine and echocardiogram data generated by the ultrasound machine.

Cardiac imaging engine 110 is generally employed by components of FIG. 1 to generate corrected cardiac images from image data 118. In this example, cardiac imaging engine 110 comprises principal component determiner 112, principal component classifier 114, and corrected cardiac image generator 116.

Figure 2:
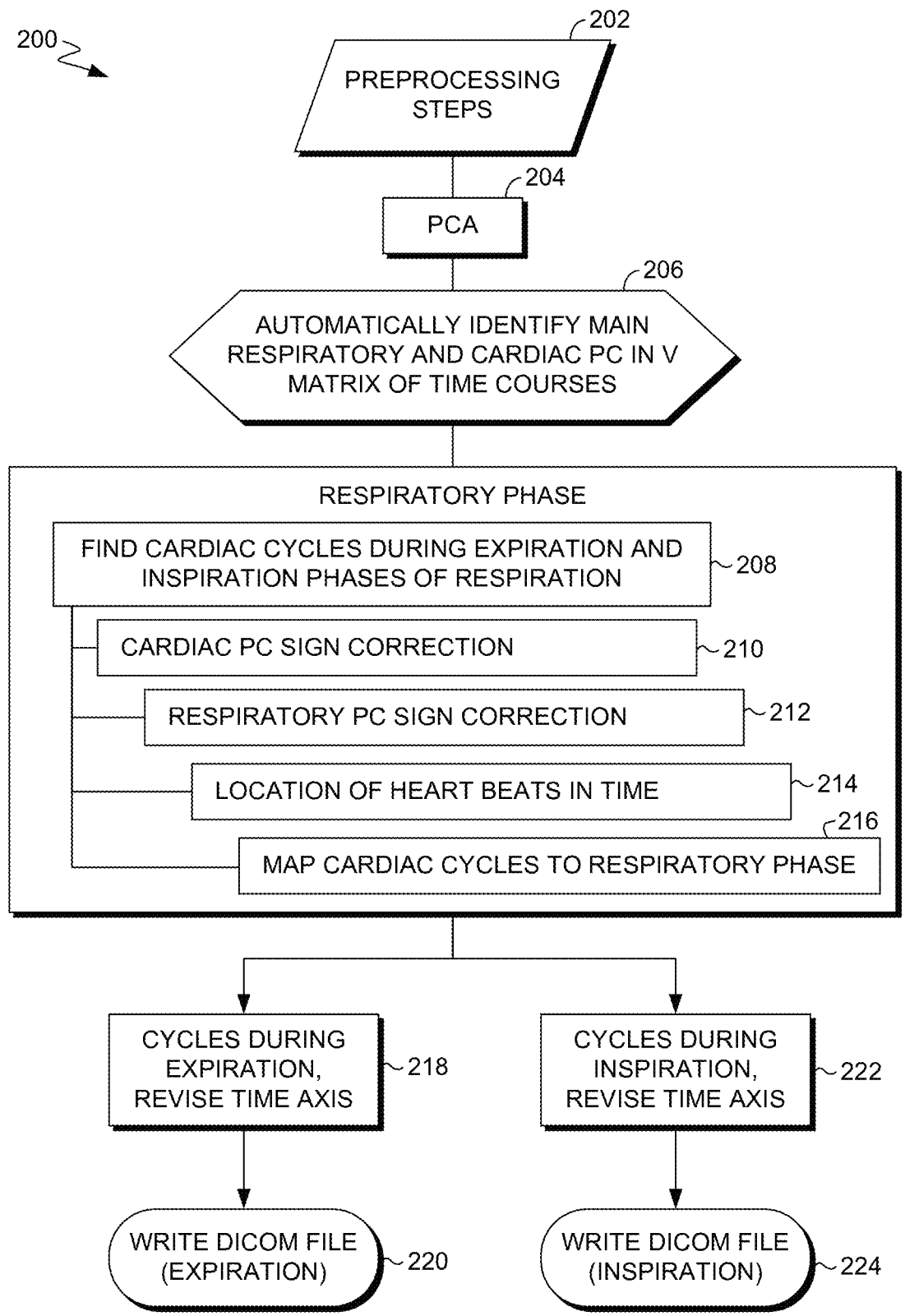
FIG. 2 illustrates an example process through which the technology of FIG. 1 can generate files suitable for generating corrected dynamic cardiac images, in accordance with an aspect described herein.

Turning to FIG. 2, FIG. 2 illustrates one example process 200 by which cardiac imaging engine 110 can generate files, such as expiration image file 120 and inspiration image file 122, which are usable to generate corrected cardiac images.

With continued reference to FIG. 1 and with reference also to FIG. 2, in general, principal component determiner 112 receives image data 118 collected by medical imaging system 124 and determines principal components. For instance, principal component determiner 112 preprocess image data 118 at 202, performs principal component analysis (PCA) at 204, and identifies respiratory principal components and cardiac principal components at 206.

In an aspect, real-time, free-breathing cardiac MR images can be acquired using MRI 126. For example, image data 118 can be collected with a conventional BSSFP (balanced steady-state free precession) sequence and the implementation of compressed sensing. The rate of acquisition may be at or between 8 and 40 frames/sec. One example of a set of other MRI acquisition parameters is given: Images may be acquired with a 208×170 voxel matrix, in-plane isotropic voxel dimension of 1.4-1.7 mm (millimeters), slice thickness of 6 mm, flip angle of 30°-42°, TR (repetition time) of 40-100 ms (milliseconds) and a total acquisition time is from about 15-to about 60 seconds. In an aspect of the invention, the image data 118 can be collected over an acquisition time in the range from about 15 seconds to about 60 seconds. Image data collected may be stored as image data 118. In an aspect, these can be stored as DICOM files. This is one suitable example, and it will be understood that other acquisition parameters may be employed.

Having collected image data 118, principal component determiner 112 preprocesses the data at 202. Preprocessing generally resolves principal components (sometimes referred to as "PCs") and their time courses with potential to report on respiratory or cardiac contractions.

The approach taken uses the largest of the time-dependent signals present in CMR scans acquired during breathing in real-time, which is stored as part of image data 118. Preprocessing supplied these candidate signals. Preprocessing steps may include those described in J. Xu, S. R. Van Doren, Tracking Equilibrium and Nonequilibrium Shifts in Data with TREND, Biophys. J. 112 (2017) 224-233, https://doi.org/10.1016/J.BPJ.2016.12.018, which is expressly incorporated herein by reference in its entirety.

At 204, principal component determiner 112 applies PCA. PCA reduces the dimensionality of data with many experimental variables. A new software platform called TRENDimage, developed from TREND, can be used to perform PCA upon stacks of DICOM image frames, captured either in a single file in enhanced DICOM format or in a directory of individual frames.

At 206, the preprocessing step of TREND unfolds the 3D scan into a 2D data matrix wherein each 2D image frame is cast into a 1D column. The time dimension remains unaltered by this process. The resulting 2D data matrix is then mean-centered (i.e., the mean is subtracted from each element of the matrix) prior to the singular value decomposition step of PCA that decomposes the preprocessed matrix into three matrices.

Having performed PCA, principal component classifier 114 at 208 classifies respiratory principal components and cardiac principal components. Principal component classifier 114 may classify, for example, a cardiac principal components, such as a complete cardiac cycles identified within the cardiac principal components, as associated with an inspiration event or an expiration event identified within the respiratory principal components. Steps 210, 212, and 214 provide an example of how principal component classifier 114 may classify events within cardiac principal components and respiratory principal components.

Figure 3A:
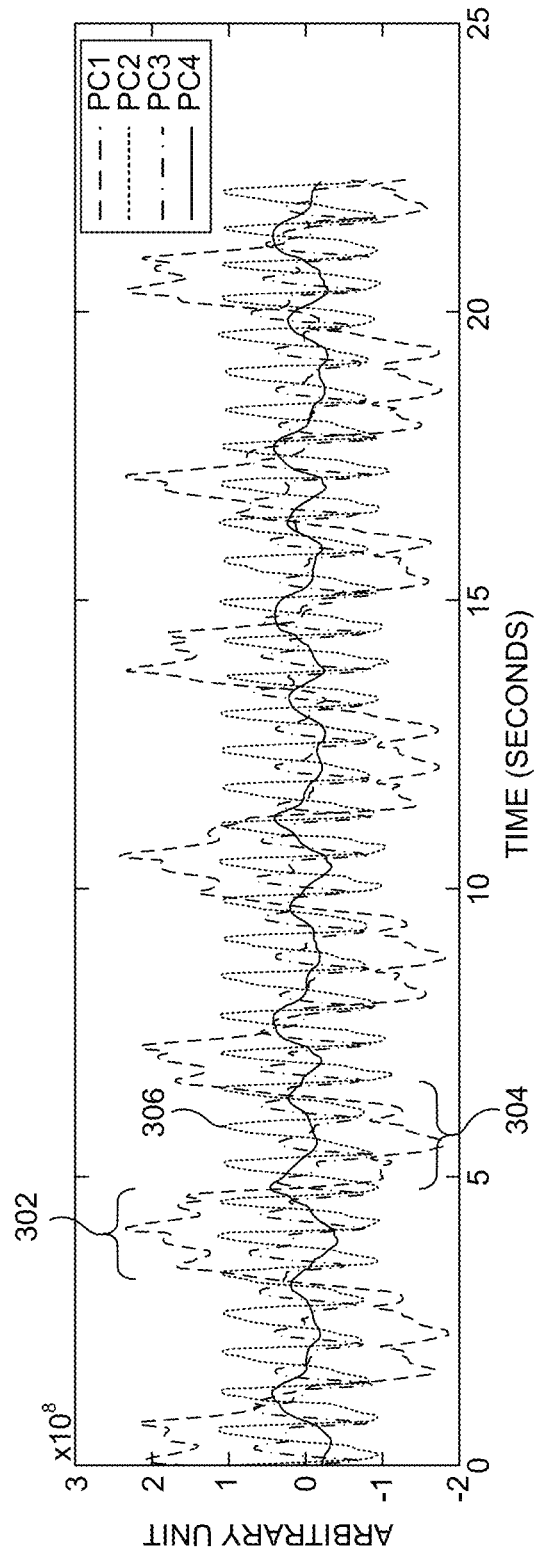
FIG. 3A illustrates an example graph resulting from principal component analysis of image data, in accordance with an aspect described herein.
Figure 3B:
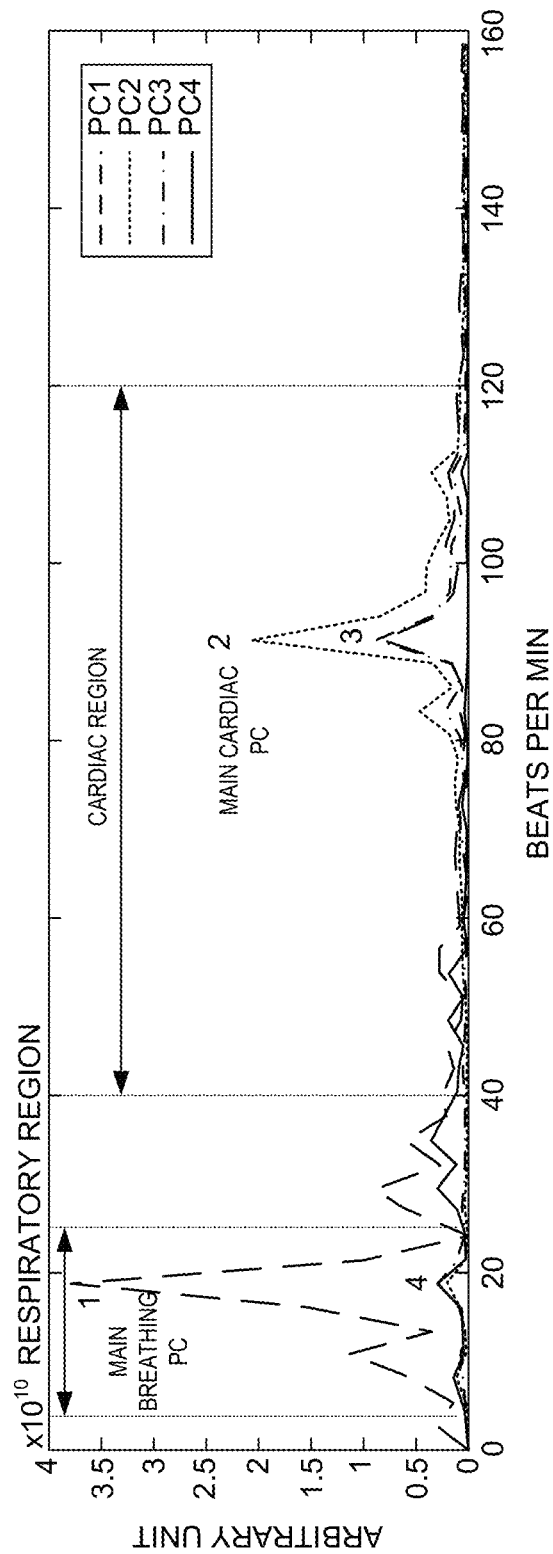
FIG. 3B illustrates an example graph resulting from application of Fourier transform to the PCA analysis of FIG. 3B, in accordance with an aspect described herein.

For instance, time courses of the cardiac events and respiratory events can be obtained from PCA. An illustration of this is provided by FIG. 3. FIG. 3A illustrates an example graph resulting from PCA analysis of image data 118. That is, FIG. 3A shows time courses of the four largest PCs obtained from a real-time CMR scan. Further, as illustrated in FIG. 3B, respiratory rates from heart rates can be distinguished in the power spectra (e.g., by applying Fourier transform) of the oscillations of the PCs in real time. FIG. 3B illustrates an example graph resulting from application of Fourier transform to the PCA analysis of FIG. 3B. That is, a Fourier transform can be performed on time courses of principal components of image data 118 to convert time courses of image data 118 to a frequency domain, where the respiratory principal components and the cardiac principal components are identified.

An advantage of this technology is that ECG and respiratory navigation can be avoided (i.e., not used) during image acquisition by the MRI or other device, unlike those required by many conventional methods, since the respiratory principal components and cardiac principal components can be identified within image data 118. Since the technology identifies the respiratory principal components and cardiac principal components, the technology can be applied to historic image data, as opposed to some conventional methods that cannot be applied if the image data was not taken synchronously with an ECG.

PCA resolves motion within the image data 118, since image data 118 comprises motion data over time of the heart. In the resulting analysis, and as illustrated in FIG. 3, PC1 comprises respiration events. In this example, 302 illustrates an inspiration event, while 304 illustrates an expiration event. PC2 is a cardiac event. More particularly, PC2 in the example tracks the largest process of cardiac contraction and expansion (including ventricular contraction). PC3 tracks the second largest mode of cardiac contraction and PC4 is the third largest mode of cardiac contraction, in this example of an MRI scan. The PC index numbers tend to vary among scans. Cardiac events, such as systole and diastole, can be identified using PC2, e.g., the largest of the cardiac events. Element 306 is an example of a cardiac event within the PC2 data. The graph in FIG. 3A provides one example in which PCA can identify respiratory principal components, including respiration events such as inspiration events and expiration events. Further, the implementation of PCA shown identifies cardiac events. Having resolved image data 118 into principal components, such as PC1 and PC2, the cardiac events can be mapped to inspiration events, as will be further described. Based on this, cardiac events, including complete cardiac cycles can be identified from within the cardiac principal components and classified as occurring during inspiration events or expiration events, as will be described.

As noted, the time courses of the cardiac cycles can be obtained from image data 118 retrospectively by using PCA, as opposed to technologies that simultaneously collect ECG data. However, PCs are arbitrary in sign when identified by PCA. As such, at 210, systole as assigned a positive sign, while diastole can be assigned a negative sign.

To distinguish systole from diastole from image data 118, the brightness of the images can be used. That is, under MRI, there is a relatively smaller volume of blood within the heart during systole than during diastole. As such, within images generated from the image data 118, diastole appears brighter relative to systole in the most common types of MRI images. As such, the most distinct and consistently identifiable starting point of each cycle in such time courses is at end-systole because it is narrower and more distinct than end-diastole. In this way, systole, and by extension other cardiac events, such as diastole, can be identified based on breadth in time or blood volume, or both.

Given this, principal component classifier 114 can further identify complete cardiac cycles within image data 118 at a time in which they occur, illustrated in FIG. 2 at 214. For instance, a complete cardiac cycle may be defined from end-systole to end-systole. To define complete cardiac cycles, the cardiac time course passing through an amplitude of zero is identified. For better estimates of the point in time of each peak at end-systole, cubic interpolation boosted the number of time points by 100-fold for peak picking. If two or three peaks were candidate peaks at end-systole, the tallest peak can be selected to mark end-systole. False, smaller peaks can be filtered out when (i) shorter than a smoothed trend line through the cardiac time course generated by low-pass filtering or (ii) when within 0.4 sec of a taller peak.

Potentially overlooked cardiac cycles and missing peaks at end-systole can be further identified. In cases of cardiac cycles that appeared longer than the mean length of a heartbeat by >1.5σ, the threshold for peak picking can be lowered to detect weaker nearby peaks at end-systole. The lower threshold can be set at the height of the weakest end-systole peak found above a trendline through the cardiac time course, smoothed by low-pass-filtering to identify any of the overlooked cardiac cycles.

Figure 4A:
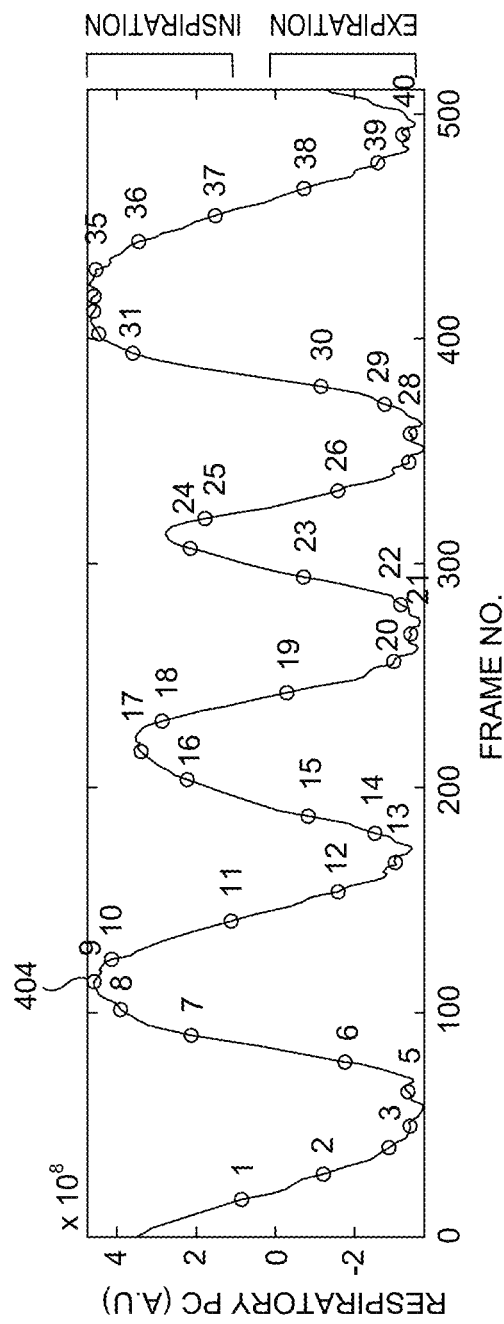
FIG. 4A illustrates a graph of an example respiratory principal component, in accordance with an aspect described herein.
Figure 4B:
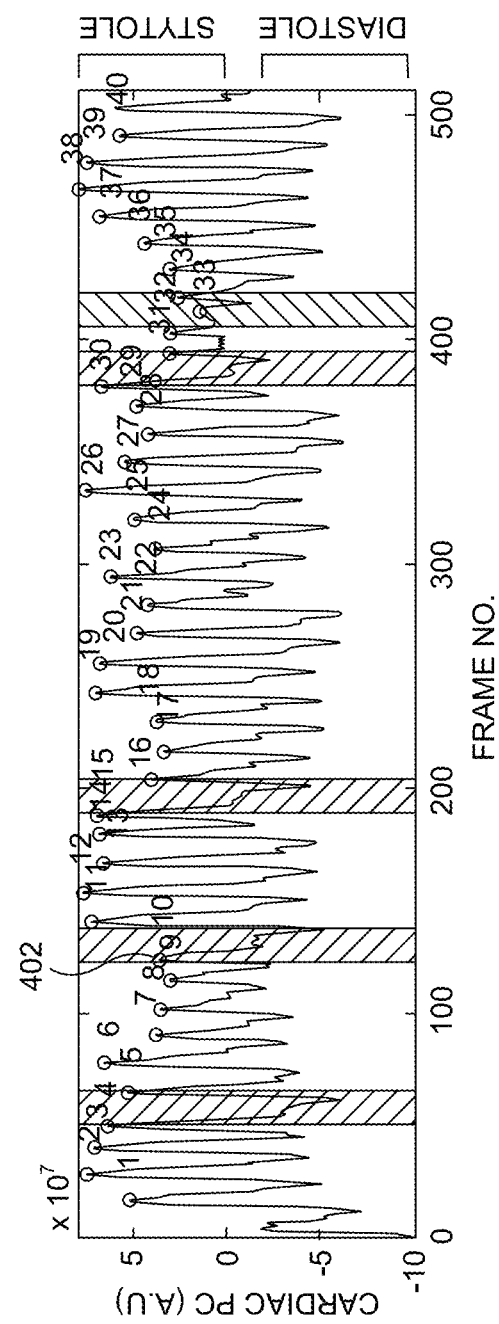
FIG. 4B illustrates a graph of an example cardiac principal component having end-systole events used to identify complete cardiac cycles mapped to the respiratory principal component of FIG. 4A, in accordance with an aspect described herein.

At 216, complete cardiac cycles are mapped to respiratory phase. Briefly turning to FIGS. 4A and 4B, the figures are graphs illustrating a non-uniform breathing pattern having respiratory events (FIG. 4A) mapped to cardiac events (FIG. 4B), which include irregular cardiac cycles of an arrhythmia. As described previously, inspiration events and expiration events are identified within the respiratory principal components indicating the reparatory events. Further, systole and diastole are identified from the cardiac events of the cardiac principal components. The points, such as point 402, illustrates the end-systole events used to identify the complete cardiac cycles from end-systole to end-systole (e.g., from a first end-systole to a second end-systole). These are mapped to the respiratory principal components in FIG. 4A. As an example, point 404 is mapped at the same time as point 402. As such, the cardiac event identified by point 402 can be classified as occurring at an inspiration event within the respiratory principal components, as illustrated by point 404.

The classified cardiac principal components can be used to generate corrected cardiac images from image data 118 using corrected cardiac image generator 116. That is, computing device 104 may employ corrected cardiac image generator 116 to recall image data from an image file associated with one or more complete cardiac cycles and display the complete cardiac cycle. The selection of the complete cardiac cycles displayed may be based on the classification of the complete cardiac cycle occurring at an expiration event or an inspiration event. Corrected cardiac images may include the one or more complete cardiac cycles. In an aspect, corrected cardiac images comprise a plurality of complete cardiac cycles that are not temporally adjacent in image data 118. As an example, complete cardiac cycles not occurring at expiration or inspiration may be removed from 118 to generate the corrected cardiac images. In an aspect, the corrected cardiac images include only one or more complete cardiac cycles determined to correspond to the expiration events.

As illustrated in FIG. 2, 218, one or more complete cardiac cycles at expiration may be selected from image data 118. Once selected, the selected one or more complete cardiac cycles may be written to a file as sequential cardiac cycles. That is, a time axis is revised to that the one or more selected complete cardiac cycles are provided sequentially when generating the corrected cardiac images from the file. Thus, when presenting the corrected cardiac images as a video, the video provides the selected complete cardiac cycles sequentially, e.g., those complete cardiac cycles occurring only at expiration or those occurring only at inspiration event, or in some cases, a set of complete cardiac cycles occurring only at inspiration and expiration. At 220, in the example embodiment illustrated, the selected one or more complete cardiac cycles are written to a DICOM file. The DICOM file at 220 is one example that may be used as expiration image file 120.

Similarly, as also illustrated in FIG. 2, 222, one or more complete cardiac cycles at inspiration may be selected from image data 118. Once selected, the selected one or more complete cardiac cycles may be written to a file as sequential cardiac cycles. That is, a time axis is revised to that the one or more selected complete cardiac cycles are provided sequentially when generating the corrected cardiac images from the file. At 224, in the example embodiment illustrated, the selected one or more complete cardiac cycles are written to a DICOM file. The DICOM file at 224 is one example that may be used as inspiration image file 122.

For instance, one or more complete cardiac cycles corresponding to one or more expiration events can be saved as part of expiration image file 120. This can be an expiration DICOM file in an aspect. In a similar manner, one or more complete cardiac cycles corresponding to one or more inspiration events can be saved as part of inspiration image file 122. This can be an inspiration DICOM file in an aspect. This separates the complete cardiac cycles occurring during expiration from complete cardiac cycles occurring during inspiration. In an aspect, complete cardiac cycles that occur at times not corresponding to inspiration or expiration are excluded from the image file(s), such as expiration image file 120 and inspiration image file 122.

While illustrated as two separate image files, it will be understood that the complete cardiac cycles occurring during expiration and complete cardiac cycles occurring during inspiration may be saved to the same file, but they may be separately and selectably recallable based on their classification. That is, computing device 104 may select for presentation a complete cardiac cycle classified as occurring during inspiration or expiration (i.e., an inspiration event or an expiration event) from one of separate files or from a same file based on the classification. Thus, in an aspect, the complete cardiac cycles corresponding to inspiration events are written to an image file separately from an image file comprising the complete cardiac cycles corresponding to the expiration events, and the corrected cardiac images are generated based on selecting either the inspiration image file or the expiration image file.

Figure 5:
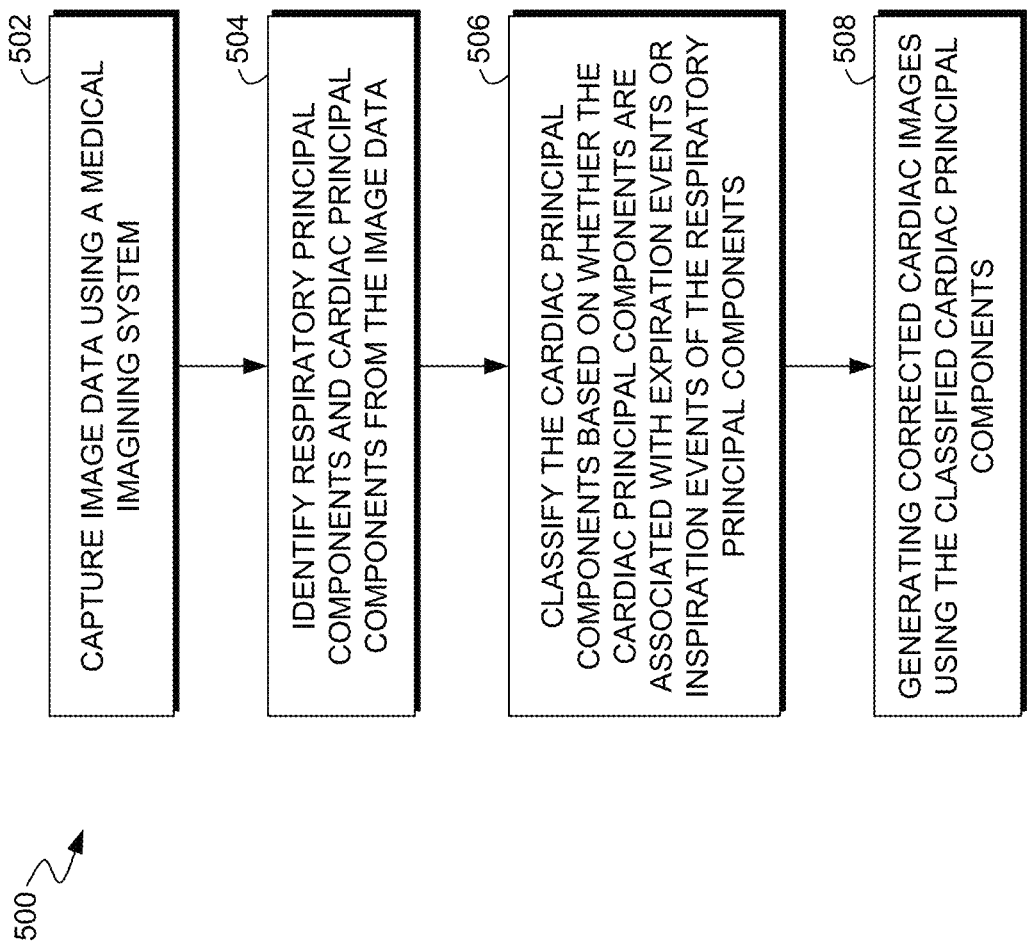
FIG. 5 illustrates a block diagram of an example method for generating corrected cardiac images from image data, in accordance with an aspect described herein.

With reference to FIG. 5, a block diagram is provided to illustrate method 500 for generating corrected cardiac images from image data. Each block of method 500 may comprise a computing process performed using any combination of hardware, firmware, or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few possibilities. Method 500 may be implemented in whole or in part by components of operating environment 100.

At block 502, image data using a medical imaging system is captured. The image data may be cardiac image data. In an aspect, the cardiac image data is captured during respiration. That is, respiration is during image data capture by the medical imaging system. The medical imaging system may be an MRI, ultrasound, or other similar diagnostic system. In an aspect, the imaging time may be in the range from about 15 seconds to about 60 seconds. As a result, the image data corresponds to a collection time in the range from about 15 seconds to about 60 seconds.

At block 504, principal components may be identified within the images data. These may include respiratory principal components and cardiac principal components. PCA may be performed on the image data or a portion thereof to resolve the image data into the principal components. Cardiac cycles, including complete cardiac cycles may be captured by the cardiac principal components. Respiration events, such as inspiration events and expiration events may be captured within the respiratory principal components.

In an aspect, a Fourier transform is performed on the image data to convert the image data to a frequency domain. The respiratory principal components and the cardiac principal components may be identified from the image data in the frequency domain.

At block 506, the cardiac principal components are classified. The cardiac principal components may be classified according to whether they are associated with expiration events or inspiration events. In an aspect, complete cardiac cycles are identified within the cardiac principal components and the complete cardiac cycles are classified as occurring during expiration events, inspiration events, or at another time in the respiratory cycle.

At block 508, corrected cardiac images are generated from the classified cardiac principal components. That is, the corrected cardiac images may be generated based on whether a complete cardiac cycle occurs at inspiration or expiration. A complete cardiac cycle may be selected from a single file having classified complete cardiac cycles. In an aspect, corrected cardiac images are generated from a file comprising only complete cardiac cycles of a same classification, e.g., the file comprises one or more complete cardiac cycles corresponding to inspiration events or inspiration events. In an aspect, the generated corrected cardiac images includes only one or more complete cardiac cycles determined to correspond to the expiration events.

EXAMPLE

Written informed consent was obtained from all subjects. Nineteen subjects (thirteen male, six female), aged from 24-73 years underwent free breathing cardiac MRI. Eight of the subjects had previous cardiac history, while eleven were healthy controls.

Aspects of the technology described herein identified principal components at respiratory and cardiac contractile rates from power spectra of the PCs, e.g., as illustrated in FIG. 3A. This achievement included optimization of the threshold at which the peak height at the respiratory rate was required to exceed the peak height at the heart rate, and vice versa, e.g., illustrated in FIG. 3B. A ratio of 2.2 emerged from the optimization. The technology accurately corrected the sign of the respiratory PC in 93% of transverse and long-axis scans. An error interchanged the labels on the expiratory and inspiratory subsets of cardiac cycles derived from the original scan. The algorithm corrected the sign of the cardiac PC accurately in 90% of transverse and long-axis scans. An error in sign correction resulted in cardiac cycles being marked from end-diastole to end-diastole rather than end-systole to end-systole.

Figure 6:
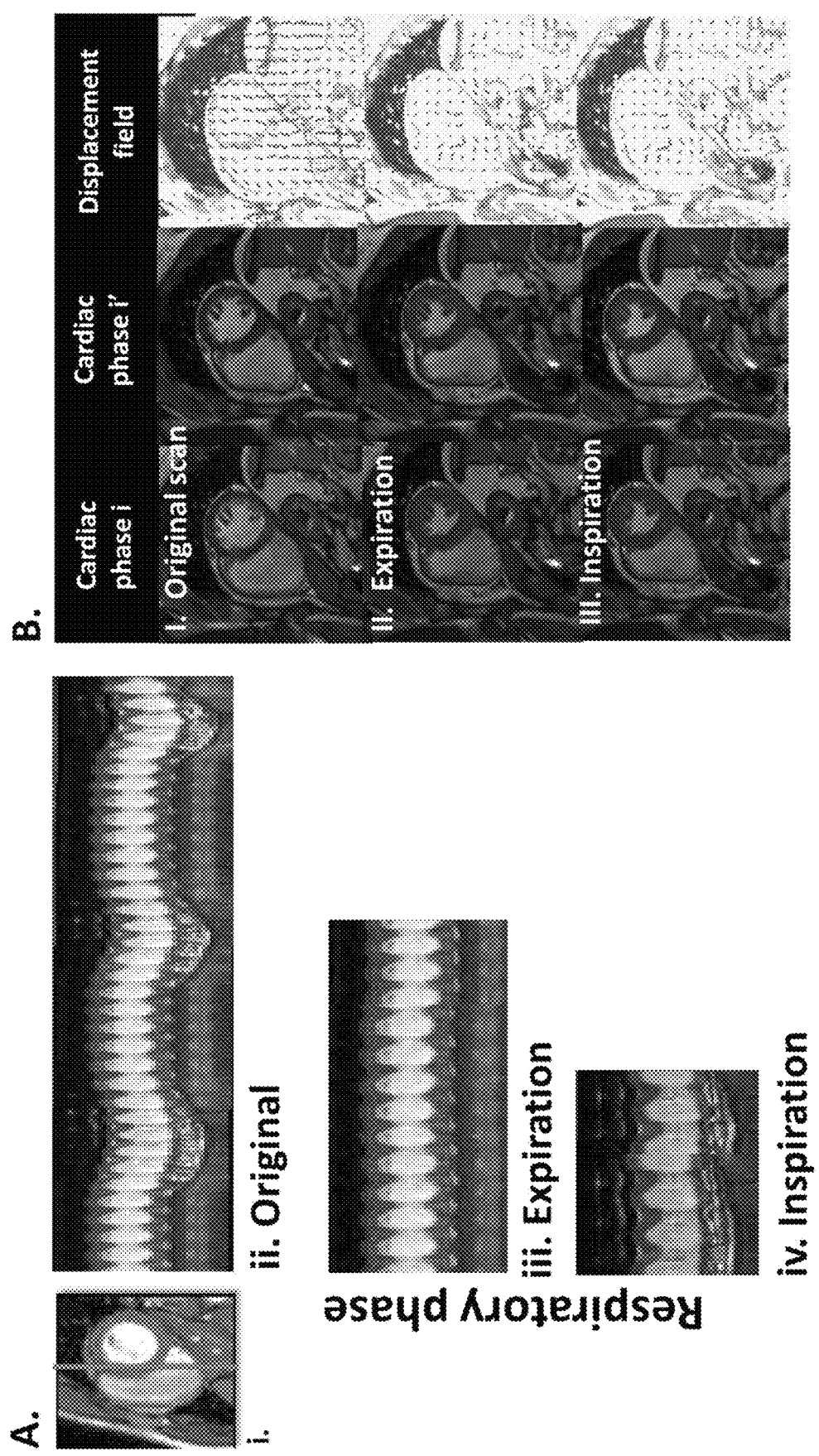
FIG. 6 provides example images from a cardiac magnetic resonance scan, in accordance with an aspect describe herein.

Suppression of respiratory motion in the background was validated by evaluating impact on movement of the heart (FIG. 6 and FIG. 7) and reproducibility of frames from cardiac cycles (FIG. 8).

The management of breathing motion by respiratory phase can be visually evaluated by comparison of a column of pixels from each frame before and after segregation into cardiac cycles at end-expiration or end-inspiration (FIG. 6A). Among the columns from cardiac cycles segregated by respiratory phase, there is less respiratory displacement of the heart (FIG. 6A). The suppression of large breathing motion was substantial during end-inspiration and excellent during end-expiration. Displacement of the heart between frames at differing respiratory phase, but similar cardiac phase, is shown in FIG. 6B. The displacement fields of the short-axis scans acquired during free breathing are dominated by respiratory movement (right panel of FIG. 6B I). After automatic grouping by respiratory phase, the displacement fields are dominated instead by cardiac motions (right panels of FIG. 6B II, III).

Figure 7:
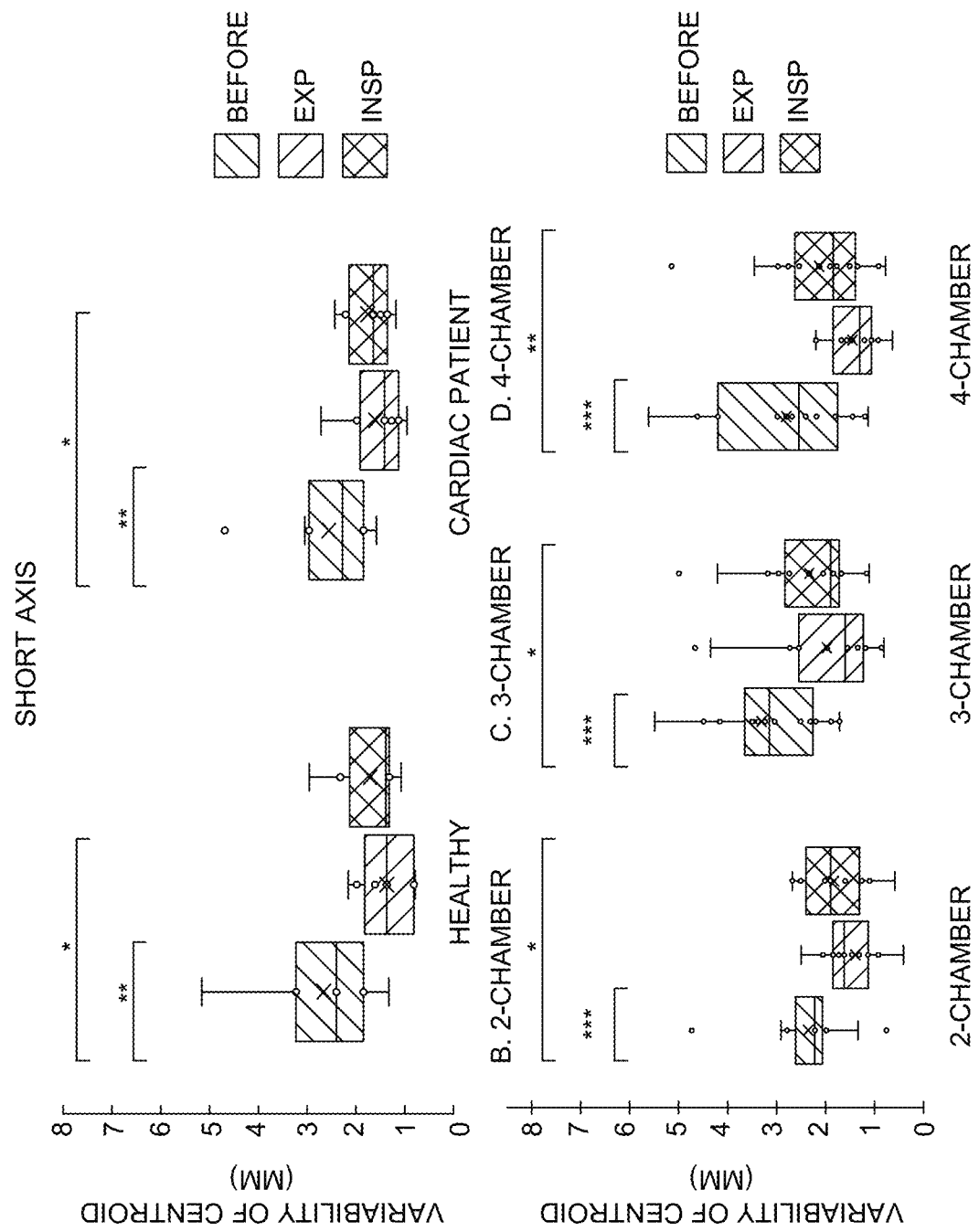
FIGS. 7 and 8A-8B provide results of an example using the technology described in FIGS. 1-6, in accordance with an aspect described herein.
Figure 8A:
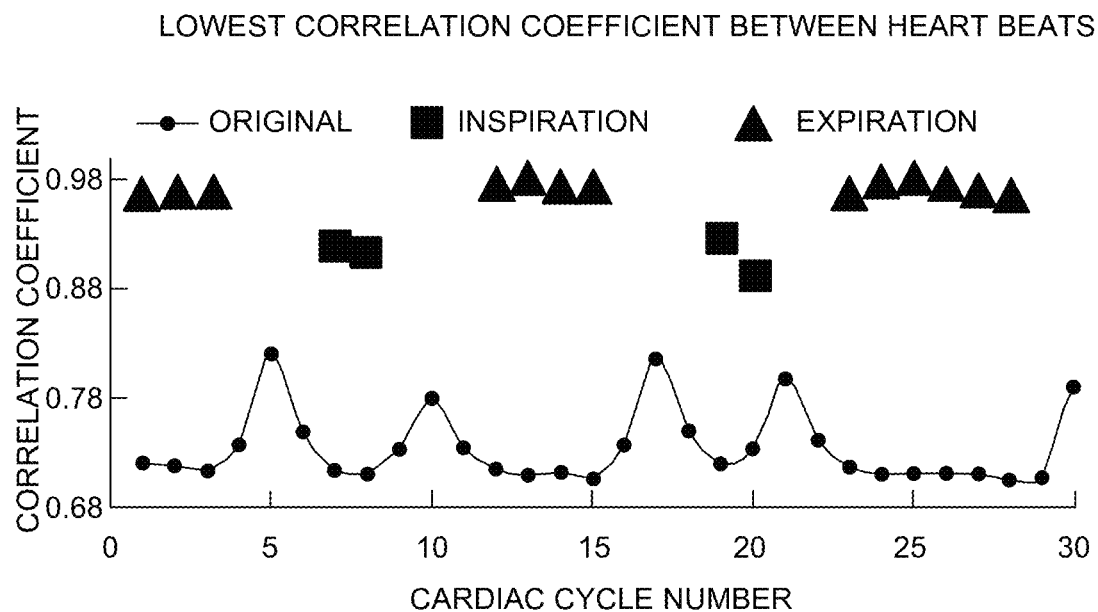

Respiratory movement of the heart was monitored in all acquired scans using the center-of-brightness, centered upon the blood in the heart (FIG. 7). Inspiratory groups of heartbeats for both transverse and long-axis views had less respiratory motion than the original scans ($P \leq 0.05$; FIG. 7). Expiratory groups of heart beats enjoyed more significant decreases of respiratory motions, both for short-axis views ($P \leq 0.01$) and long-axis views ($P \leq 0.001$; FIG. 4). Thus, cardiac cycles from expiration were improved even more than those from inspiration.

The uniformity and reproducibility of the heartbeats was assessed using correlation coefficients between intensities of voxels of each frame at end-systole with a reference frame at end-systole. This was done both before and after motion correction. The smallest of those correlation coefficients are plotted in the example in FIG. 8A.

Figure 8B:
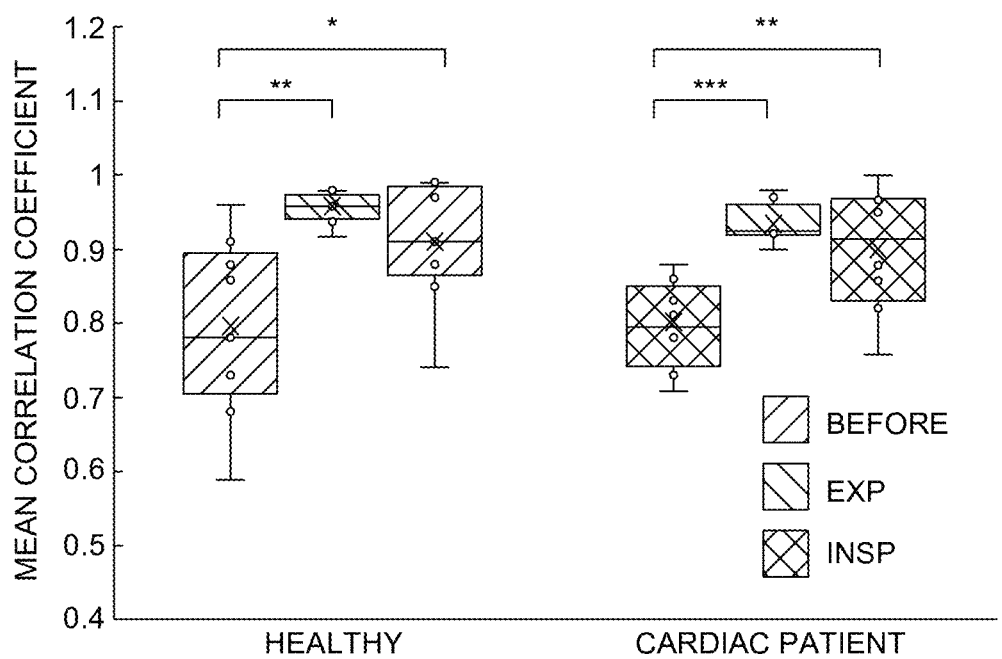

The consistency of the heartbeats, measured by correlation coefficients, was compared by t-tests before and after correction of short axis view of the 19 subjects that underwent CMR. Motion-corrected images rendered the heartbeats clearly more consistent with one another (FIG. 8B). The improvements by respiratory grouping of heartbeats are statistically significant. The inspiratory groups of heartbeats improved the correlation coefficients with $P \leq 0.05$ for the healthy subjects and $P \leq 0.01$ for the subjects with histories of cardiac symptoms (FIG. 8B). The expiratory groups improved the correlation coefficients with $P \leq 0.01$ for the healthy subjects and $P \leq 0.001$ for the subjects with a history of cardiac symptoms.

Figure 9:
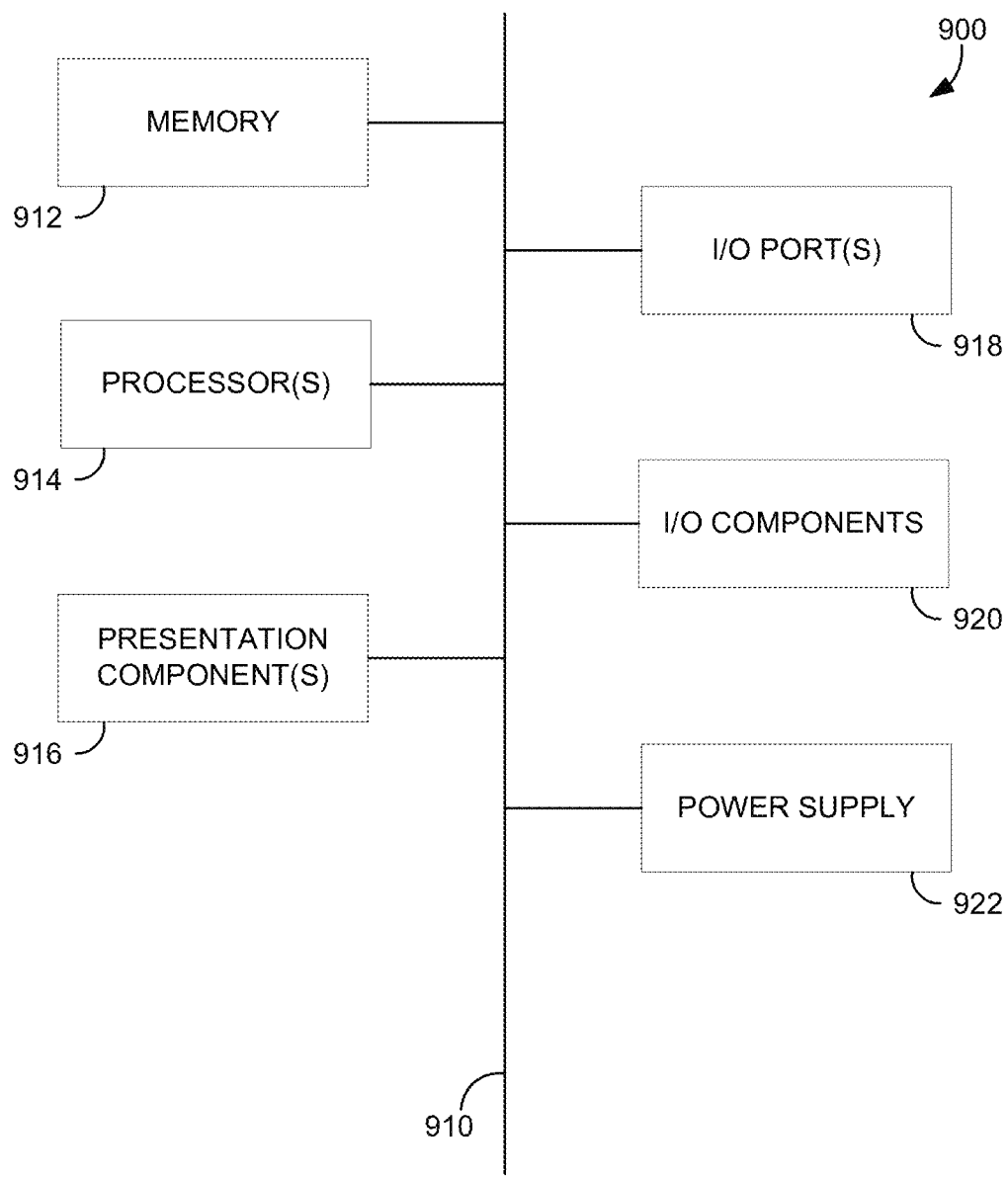
FIG. 9 illustrates an example computing device suitable for implementing aspects of the described technology, in accordance with an aspect described herein.

Having described an overview and an example of some embodiments of the present technology, an example computing environment in which embodiments of the present technology may be implemented is described below in order to provide a general context for various aspects of the present technology. Referring now to FIG. 9 in particular, an example operating environment for implementing embodiments of the present technology is shown and designated generally as computing device 900. Computing device 900 is but one example of a suitable computing environment and is not intended to suggest any limitation as to the scope of use or functionality of the technology. Computing device 900 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 9, computing device 900 includes bus 910, which directly or indirectly couples the following devices: memory 912, one or more processors 914, one or more presentation components 916, input/output (I/O) ports 918, input/output components 920, and illustrative power supply 922. Bus 910 represents what may be one or more buses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 9 is merely illustrative of an example computing device that can be used in connection with one or more embodiments of the present technology. Distinction is not made between such categories as "workstation," "server," "laptop," "hand-held device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and that can be accessed by computing device 900. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 912 includes computer-storage media in the form of volatile or nonvolatile memory. The memory may be removable, non-removable, or a combination thereof. Example hardware devices include solid-state memory, hard drives, optical-disc drives, etc. Computing device 900 includes one or more processors that read data from various entities, such as memory 912 or I/O components 920. Presentation component(s) 916 presents data indications to a user or other device. Example presentation components include a display device, speaker, printing component, vibrating component, etc.

I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 900. Computing device 900 may be equipped with depth cameras, such as stereoscopic camera systems, infrared camera systems, RGB (red-green-blue) camera systems, touchscreen technology, or other like system, or combinations of these, for gesture detection and recognition. Additionally, the computing device 900 may be equipped with accelerometers or gyroscopes that enable detection of motion. The output of the accelerometers or gyroscopes may be provided to the display of computing device 900 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions include any software, including low-level software written in machine code; higher level software, such as application software; and any combination thereof. In this regard, components for generating corrected cardiac images can manage resources and provide the described functionality. Any other variations and combinations thereof are contemplated within embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to cardiac imaging engine 110, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of cardiac imaging engine 110, among other functions, may be performed by server 102, computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or hardware-based buses, receivers, or transmitters using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

Some example aspects that can be practiced from the forgoing description include the following:

Aspect 1: A system comprising: at least one processor; and one or more computer storage media storing computer readable instructions thereon that when executed by the at least one processor cause the at least one processor to perform operations comprising: capturing image data using a medical imaging system; identifying respiratory principal components and cardiac principal components from the image data; classifying the cardiac principal components based on whether the cardiac principal components are associated with expiration events or inspiration events of the respiratory principal components; and generating corrected cardiac images using the classified cardiac principal components.

Aspect 2: Aspect 1, wherein the medical imaging system is a magnetic resonance imaging (MRI) system, and the image data corresponds to MRI collected data.

Aspect 3: Aspect 1, wherein the medical imaging system is an ultrasound, and the image data corresponds to an echocardiogram.

Aspect 4: Any of Aspects 1-3, wherein the image data corresponds to a collection time in the range from about 15 seconds to about 60 seconds. In another embodiment, Aspect 4 comprises image data that corresponds to a collection time in the range from about 15 seconds to about 50 seconds.

Aspect 5: Any of Aspects 1-4, further comprising, performing a Fourier transform on the image data to convert the image data to a frequency domain, wherein the respiratory principal components and the cardiac principal components are identified from the image data in the frequency domain.

Aspect 6: Any of Aspects 1-5, further comprising identifying complete cardiac cycles from a first end-systole to a second end-systole within the cardiac principal components, wherein systole is determined based on breadth in time or blood volume, or both.

Aspect 7: Aspect 6, wherein classifying the cardiac principal components further comprises determining the complete cardiac cycles correspond to the inspiration events and the expiration events.

Aspect 8: Aspect 7, wherein the corrected cardiac images include only one or more complete cardiac cycles determined to correspond to the expiration events.

Aspect 9: A method performed by one or more processors, the method comprising: accessing image data captured by a medical imaging system; identifying respiratory principal components and cardiac principal components from the image data; classifying the cardiac principal components based on whether the cardiac principal components are associated with expiration events or inspiration events of the respiratory principal components; and generating corrected cardiac images using the classified cardiac principal components.

Aspect 10: Aspect 9, wherein the medical imaging system is: a magnetic resonance imaging (MRI) system, and the image data corresponds to MRI collected data; or an ultrasound, and the image data corresponds to an echocardiogram.

Aspect 11: Any of Aspects 9-10, wherein the image data corresponds to a collection time in the range from about 15 seconds to about 60 seconds. In another embodiment, Aspect 11 comprises image data that corresponds to a collection time in the range from about 15 seconds to about 50 seconds.

Aspect 12: Any of Aspects 9-11, wherein classifying the cardiac principal components further comprises identifying complete cardiac cycles from the image data that correspond to the inspiration events and the expiration events.

Aspect 13: Aspect 12, wherein the corrected cardiac images include only one or more complete cardiac cycles identified as corresponding to the expiration events.

Aspect 14: One or more computer storage media storing computer readable instructions thereon that, when executed by a processor, cause the processor to perform a method comprising: accessing image data captured by a medical imaging system; classifying cardiac principal components based on whether the cardiac principal components are associated with expiration events or inspiration events of respiratory principal components within the image data; and generating corrected cardiac images using the classified cardiac principal components.

Aspect 15: Aspect 14, wherein the medical imaging system is a magnetic resonance imaging (MRI) system, and the image data corresponds to MRI collected data.

Aspect 16: Aspect 14, wherein the medical imaging system is an ultrasound, and the image data corresponds to an echocardiogram.

Aspect 17: Any of Aspects 14-16, wherein the image data corresponds to a collection time in the range from about 15 seconds to about 60 seconds. In another embodiment, Aspect 17 comprises image data that corresponds to a collection time in the range from about 15 seconds to about 50 seconds.

Aspect 18: Any of Aspects 14-17, further comprising identifying complete cardiac cycles within the cardiac principal components based on systole.

Aspect 19: Aspect 18, wherein classifying the cardiac principal components further comprises determining the complete cardiac cycles correspond to the inspiration events and the expiration events.

Aspect 20: Aspect 19, wherein the corrected cardiac images include only one or more complete cardiac cycles determined to correspond to the expiration events.

What is claimed is:

1. A system comprising:
   at least one processor; and
   one or more computer storage media storing computer readable instructions thereon that when executed by the at least one processor cause the at least one processor to perform operations comprising:
   capturing image data using a medical imaging system;
   identifying respiratory principal components and cardiac principal components from the image data;
   classifying the cardiac principal components based on whether the cardiac principal components are associated with expiration events or inspiration events of the respiratory principal components; and
   generating corrected cardiac images using the classified cardiac principal components.

2. The system of claim 1, wherein the medical imaging system is a magnetic resonance imaging (MRI) system, and the image data corresponds to MRI collected data.

3. The system of claim 1, wherein the medical imaging system is an ultrasound, and the image data corresponds to an echocardiogram.

4. The system of claim 1, wherein the image data corresponds to a collection time in the range from about 15 seconds to about 60 seconds.

5. The system of claim 1, further comprising, performing a Fourier transform on the image data to convert the image data to a frequency domain, wherein the respiratory principal components and the cardiac principal components are identified from the image data in the frequency domain.

6. The system of claim 1, further comprising identifying complete cardiac cycles from a first end-systole to a second end-systole within the cardiac principal components, wherein systole is determined at least based on blood volume.

7. The system of claim 6, wherein classifying the cardiac principal components further comprises determining the complete cardiac cycles correspond to the inspiration events and the expiration events.

8. The system of claim 7, wherein the corrected cardiac images include only one or more complete cardiac cycles determined to correspond to the expiration events.

9. A method performed by one or more processors, the method comprising:
   accessing image data captured by a medical imaging system;
   identifying respiratory principal components and cardiac principal components from the image data;
   classifying the cardiac principal components based on whether the cardiac principal components are associated with expiration events or inspiration events of the respiratory principal components; and
   generating corrected cardiac images using the classified cardiac principal components.

10. The method of claim 9, wherein the medical imaging system is:
    a magnetic resonance imaging (MRI) system, and the image data corresponds to MRI collected data; or
    an ultrasound, and the image data corresponds to an echocardiogram.

11. The method of claim 9, wherein the image data corresponds to a collection time in the range from about 15 seconds to about 60 seconds.

12. The method of claim 9, wherein classifying the cardiac principal components further comprises identifying complete cardiac cycles from the image data that correspond to the inspiration events and the expiration events.

13. The method of claim 12, wherein the corrected cardiac images include only one or more complete cardiac cycles identified as corresponding to the expiration events.

14. One or more computer storage media storing computer readable instructions thereon that, when executed by a processor, cause the processor to perform a method comprising:
    accessing image data captured by a medical imaging system;
    classifying cardiac principal components based on whether the cardiac principal components are associated with expiration events or inspiration events of respiratory principal components within the image data; and
    generating corrected cardiac images using the classified cardiac principal components.

15. The media of claim 14, wherein the medical imaging system is a magnetic resonance imaging (MRI) system, and the image data corresponds to MRI collected data.

16. The media of claim 14, wherein the medical imaging system is an ultrasound, and the image data corresponds to an echocardiogram.

17. The media of claim 14, wherein the image data corresponds to a collection time in the range from about 15 seconds to about 60 seconds.

18. The media of claim 14, further comprising identifying complete cardiac cycles within the cardiac principal components based on systole.

19. The media of claim 18, wherein classifying the cardiac principal components further comprises determining the complete cardiac cycles correspond to the inspiration events and the expiration events.

20. The media of claim 19, wherein the corrected cardiac images include only one or more complete cardiac cycles determined to correspond to the expiration events.

\* \* \* \* \*